D. FERGUSON AND A. T. SCHEIWER.
QUICK DETACHABLE SWIVEL COUPLING.
APPLICATION FILED JULY 17, 1920.
1,371,882.
Patented Mar. 15, 1921.
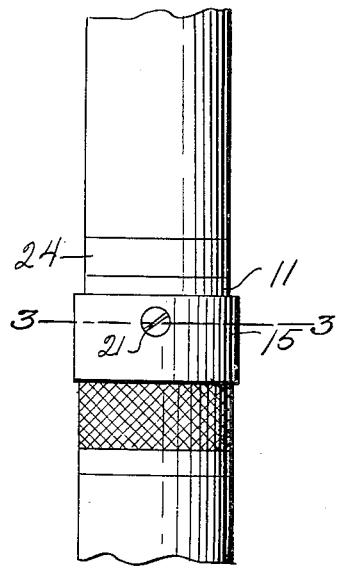
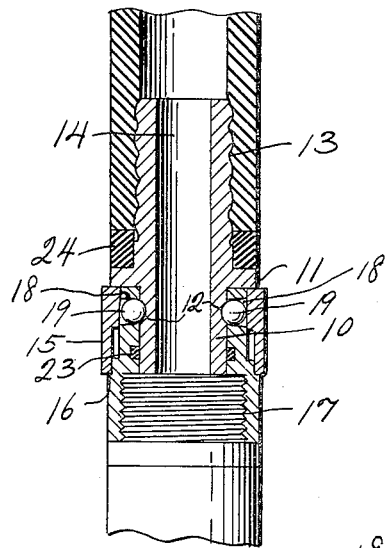
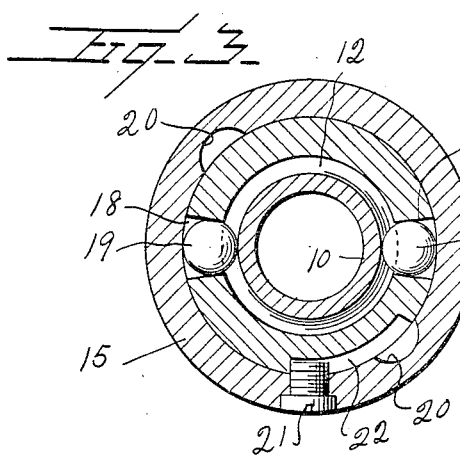
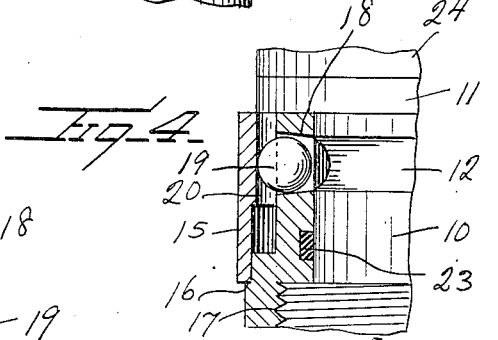
Inventors
D. Ferguson and
A. T. Scheiwer
By Watson E. Coleman
Attorney

UNITED STATES PATENT OFFICE.

DAVID FERGUSON AND ALBERT T. SCHEIWER, OF ERIE, PENNSYLVANIA, ASSIGNORS TO ACCURATE TOOL WORKS, OF ERIE, PENNSYLVANIA, A COPARTNERSHIP OF PENNSYLVANIA.

QUICK-DETACHABLE SWIVEL-COUPLING.

1,371,882.  Specification of Letters Patent.  Patented Mar. 15, 1921.

Application filed July 17, 1920. Serial No. 397,015.

*To all whom it may concern:*

Be it known that we, DAVID FERGUSON and ALBERT T. SCHEIWER, citizens of the United States, residing at Erie, in the county of Erie and State of Pennsylvania, have invented certain new and useful Improvements in Quick-Detachable Swiveled Couplings, of which the following is a specification, reference being had to the accompanying drawings.

This invention relates to couplings, and particularly to hose couplings.

The general object of our invention is to provide a quick detachable hose coupling of such character that one member of the coupling is swiveled upon the other member of the coupling for free rotation thereon while engaged.

A further object of the invention is to provide a construction of this character wherein the two members of the coupling are locked or unlocked by a slight rotation of a locking element having no longitudinal movement or screwing action.

A further object is to provide a construction of this character wherein the parts when coupled are freely rotatable upon each other but firmly engaged from any relative longitudinal movement.

Other objects will appear in the course of the following description.

Our invention is illustrated in the accompanying drawings, wherein:—

Figure 1 is an elevation of a coupling constructed in accordance with our invention;

Fig. 2 is a longitudinal diametric section thereof;

Fig. 3 is a transverse section on the line 3—3 of Fig. 1;

Fig. 4 is a fragmentary enlarged longitudinal section showing the locking balls displaced to permit the disengagement of the coupling.

Referring to these drawings, it will be seen that our improved coupling consists of a male member 10 having a flange 11 adjacent one end and a circumferential groove 12 formed with exterior screw-threads 13 and a longitudinal smooth bore 14.

The female member is tubular to receive the male member and, as illustrated in Fig. 2, is reduced in thickness adjacent that end which receives the male member to receive thereon an oscillatable collar or sleeve 15, this sleeve resting against the shoulder 16 formed at the lower end of the collar receiving recess. The interior bore of the female member is of a diameter sufficient to snugly receive the male member and below this interior portion it is enlarged and formed with interior screw-threads 17. The female member adjacent its receiving end is formed with a plurality, as for instance two, of ball receiving sockets 18. These sockets are larger at their outer ends than at their inner ends and open upon the outer and inner faces of the male member and therein are disposed the balls 19 which are of such diameter that when forced inward into the sockets they will protrude beyond the inner face of the female member and into the circumferential groove 12 of the male member.

The locking sleeve 15 has a series of relatively shallow, longitudinally extending grooves 20 formed on its inner face which are adapted to register with the sockets 18 and the balls 19. These grooves are of sufficient depth to permit the balls 19 to be forced outward so that the balls will not project inward beyond the inner surface of the female member. When the sleeve is given a slight rotation, however, to carry the grooves away from the balls, the surface of the sleeve which is concentric to the axial center of the female member will engage the balls and force them inward and prevent any outward movement of the balls. The sleeve also carries a pin or screw 21 which extends diametrically through the sleeve and engages in a circumferentially extending recess or groove 22 on the outer face of the female member. The screw 21 locks the sleeve in place from longitudinal movement and limits the rotatable movement of the sleeve. The screw, therefore, forms a stop limiting the arc of oscillation of the sleeve. This groove 2 is so disposed that when the pin 21 engages one end of the groove 22, the balls will be immediately in register with the longitudinal grooves 20. It will thus be seen that a ⅛ turn of the sleeve is sufficient to lock or unlock the balls and, therefore, lock or unlock the coupling members to or from each other.

When it is desired to insert the male member, the sleeve 15 is rotated to carry the grooves 20 into position behind the balls 19, and then the male member is inserted and the sleeve 15 is rotated out of the position stated so as to force the balls into the circumferential groove 12 of the member, locking the male and female members together but permitting the male member to have free rotary movement with relation to the female member so that there is a swivel engagement between the two coupling members. Suitable packing may be applied in the groove 23 formed in the female member to insure a water-tight joint. A hose clamp 24 of any suitable construction may also be applied around the hose to hold the hose to the male member 13. It will be seen that by this means the coupling members are very readily connected to each other or disconnected from each other, and that they may be readily locked or unlocked by a slight oscillation of the sleeve 15.

We are aware of the patent to W. S. Sutton, No. 1,088,847, granted March 3, 1914, in which a male member is locked to a female member by a plurality of radially movable balls held in their locking position by a collar, but this patent illustrates a locking collar which has screw-threaded engagement with the female member and which is, therefore, liable to become unscrewed and which has a longitudinal motion as well as a motion around the axis of the coupling in order to release or lock the balls. With our device, the coupling is locked or unlocked by a simple rotation of the coupling sleeve or collar around the central axis of the coupling, in which there is no longitudinal movement of the locking collar, and the locking collar is not screw-threaded to the female member so that there is no danger of the locking collar coming off or being accidentally unscrewed. Furthermore, the pin or screw 21 prevents any longitudinal movement of the collar and limits its rotational movement so that a person manipulating the coupling knows just when the coupling sleeve has been turned to a position to release the male member or to a position to lock it. Furthermore, there is no danger of the parts becoming loose so that the locking balls will drop out of the coupling.

While we have described this coupling device with special reference to use as a hose coupler, it is to be understood that it may be used for coupling any two elements together.

We claim:—

1. A coupling of the character described comprising a male member formed with a circumferential groove, a female member having a bore to receive the male member and having radially disposed, outwardly flaring sockets open at their outer and inner ends adapted to register with the groove when the members are connected, locking members disposed in said sockets and circular in cross section and having a diameter greater than the thickness of the wall of the female member, and a sleeve fitting over the exterior of the female member, held from longitudinal movement but having circumferential movement to a limited degree, the inner surface of the sleeve normally forcing the locking members inward but the sleeve having recesses adapted, upon a circumferential adjustment of the sleeve, to register with the locking members to permit outward movement thereof.

2. A coupling of the character described comprising a male member formed with a circumferential groove, a female member having a bore to receive the male member and having radially extending, outwardly flaring sockets open at their outer and inner ends and adapted to aline with the groove when the members are engaged, locking balls disposed in said sockets and having a diameter greater than the thickness of the wall of the female member, and a sleeve fitting over the exterior of the female member and against a shoulder thereon, the sleeve having longitudinally extending recesses adapted upon a circumferential adjustment of the sleeve to register with the locking members to permit outward movement of the locking members, and single means holding the sleeve to the female member and against said shoulder but permitting limited circumferential movement of the sleeve.

3. A coupling of the character described comprising a male member formed with a circumferential groove, a female member having a bore to receive the male member and having radially extending, outwardly flaring sockets open at their outer and inner ends and adapted to aline with the groove when the members are engaged, locking balls disposed in said sockets and having a diameter greater than the thickness of the wall of the female member, a sleeve fitting over the exterior of the female member and against a shoulder thereon, the sleeve having longitudinally extending recesses adapted, upon a circumferential adjustment of the sleeve, to register with the locking members to permit outward movement of the locking members, and a screw passing radially through the sleeve, the female member being provided with a circumferential groove into which said screw projects, the groove having end walls forming limiting stops against which the screw engages when the sleeve is rotated, the removal of the screw permitting the removal of the sleeve from the female member.

In testimony whereof we hereunto affix our signatures.

DAVID FERGUSON.
ALBERT T. SCHEIWER.